Figure 1:
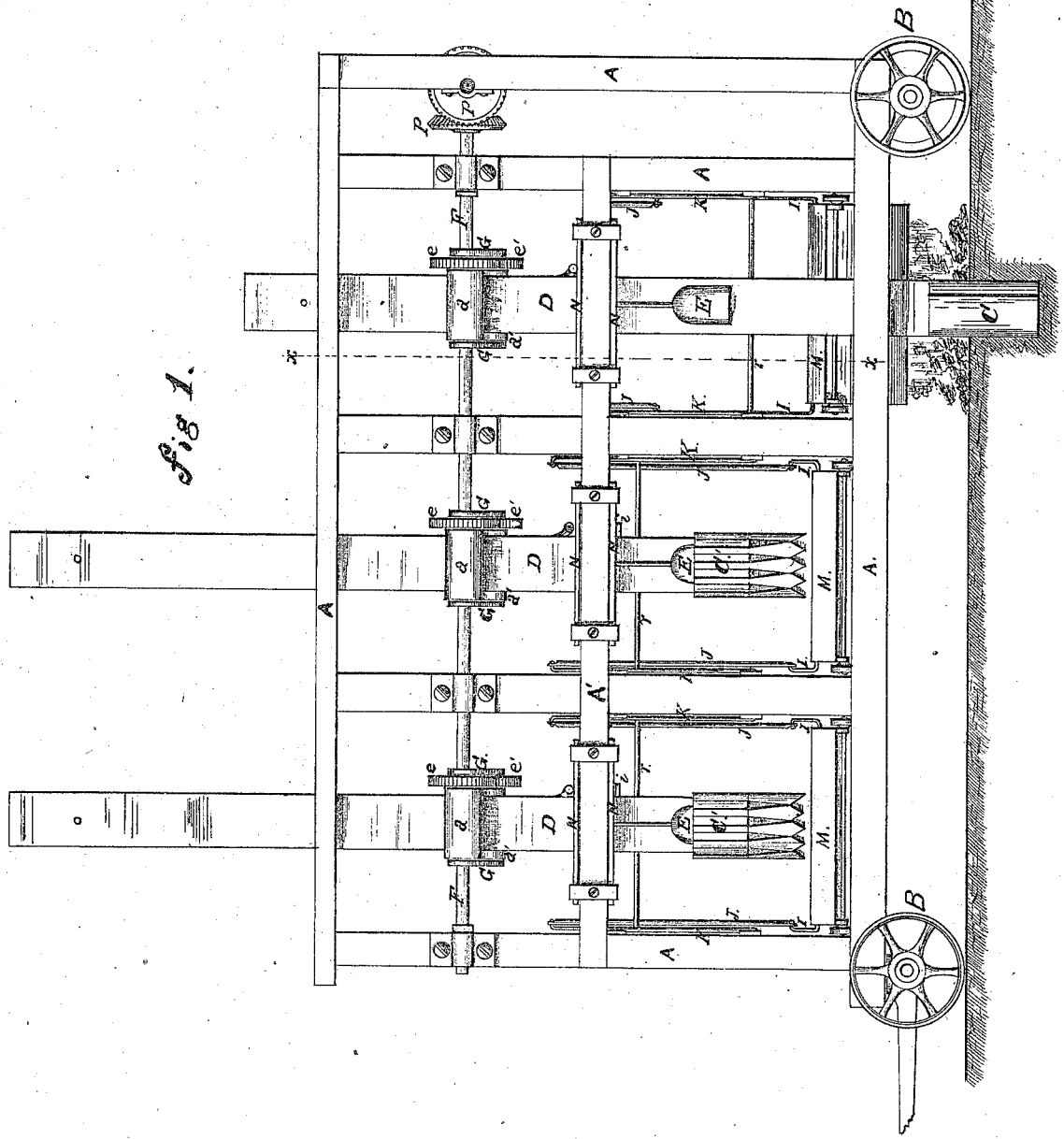

FRANKLIN TAYLOR'S,
DITCHING MACHINE.

3 Sheets--Sheet 1.

No. 120,836.  Patented Nov. 14, 1871.

WITNESSES.
O. F. Mayhew
G. A. Skinner

Franklin Taylor INVENTOR.
INDIANAPOLIS, IND

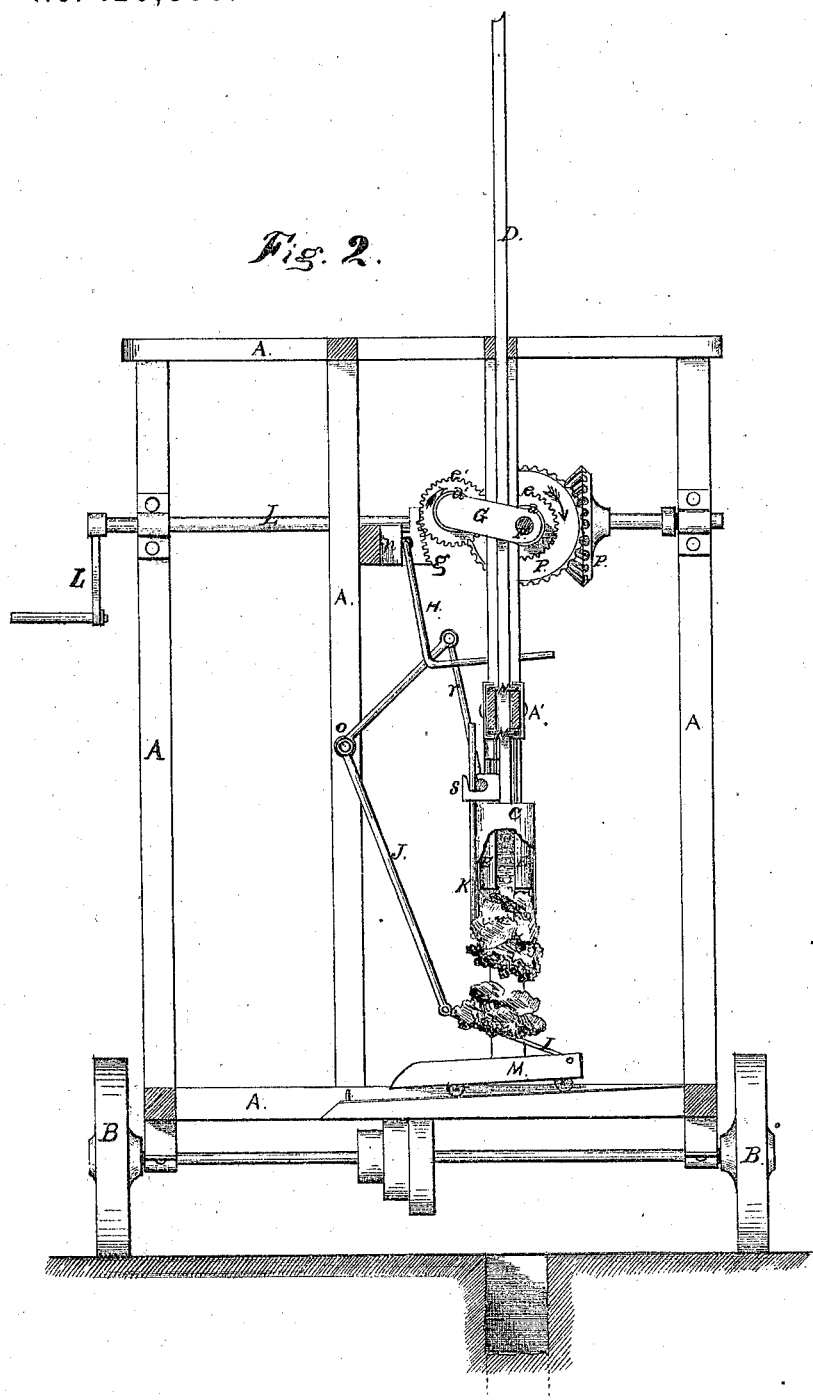

FRANKLIN TAYLOR'S,
DITCHING MACHINE.
3 Sheets--Sheet 3.
No. 120,836.
Patented Nov. 14, 1871.
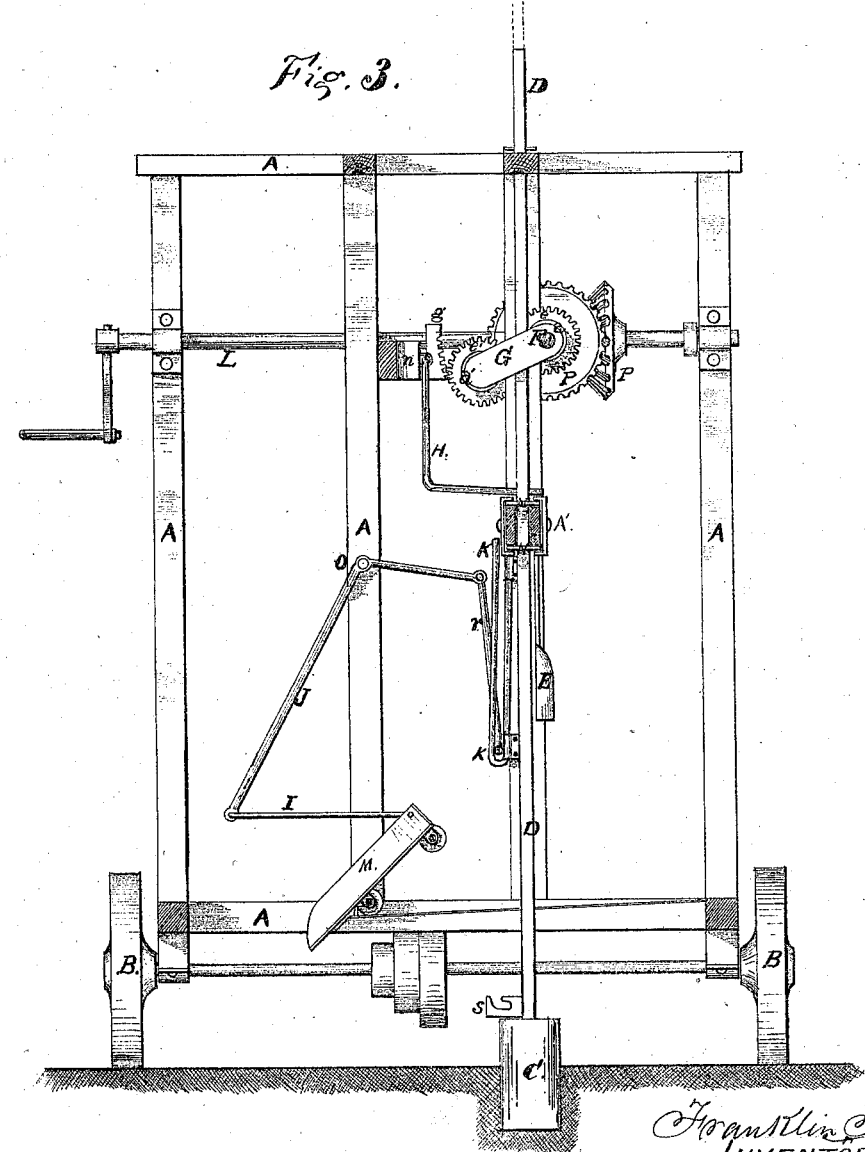
Witnesses.
O. F. Mayhew
G. A. Skinner
Franklin Taylor
INVENTOR.
INDIANAPOLIS, IND.

120,836

UNITED STATES PATENT OFFICE.

FRANKLIN TAYLOR, OF INDIANAPOLIS, INDIANA.

IMPROVEMENT IN DITCHING-MACHINES.

Specification forming part of Letters Patent No. 120,836, dated November 14, 1871; antedated October 28, 1871.

*To all whom it may concern:*

Be it known that I, FRANKLIN TAYLOR, of Indianapolis, in the county of Marion and State of Indiana, have invented certain Improvements in Ditching-Machines, of which the following is a specification:

My invention consists in the form of construction and the arrangement and mode of operating a series of circular spades that work vertically in a suitable frame that is mounted on wheels and propelled forward by horse or other power that at the same time actuates the spades, and the latter, on being raised to the desired height, descend by their own gravity with sufficient force to enter the soil. The soil inclosed by the spades is raised with them and discharged upon reciprocating tipping-platforms that dump it at the side of the ditch.

Figure 1 is a side elevation of a ditching-machine embodying my invention. Fig. 2 is a transverse vertical section of the same taken on the line $x$ $x$, Fig. 1, showing the position of the several parts when the spades are elevated. Fig. 3 is the same view, showing the several parts in position when the spades are down and have entered the earth. Fig. 4 is a bottom-end view of one of the spades.

A is the frame-work of the machine, to which all the other parts are attached, and which is mounted on trucks B. The spades C C' are circular in form, and, when made like the one shown at C, they are composed of two blades of steel bent into a semicircular form, which are attached to the flat shaft D, as shown in the bottom-end view, Fig. 4. When made as shown at C' they are composed of a series of narrow-pointed blades, attached to the shaft D. These spades are raised and dropped by mechanism which will be hereafter described, and are so constructed as to penetrate the soil by their own gravity when let fall, and to clasp and hold it as they are elevated. The soil brought up by the spades is discharged from them by means of two stationary plungers or scrapers, E, one on each side of the shaft D, depending from rods attached to the sliding guides N, through which the spade-shafts work. The spades are elevated by means of friction-rollers $a$ on the longitudinal shaft F on one side of the spade-shaft D and rollers $a'$ on the opposite side. The rollers $a'$ are hung to revolve in the outer ends of the arms G, the other ends of the arms being hung on the shaft F. The rollers $a$ are fixed on shaft F and rotate with it. The rollers $a'$ are rotated by means of cog-wheels $e$, also fixed on shaft F, that gear with cog-wheels $e'$ on the shaft of roller $a'$. The spade-shaft being clasped between the rollers $a$ $a'$ is elevated by their rotation. When the spades have been raised to the proper height the roller $a'$ is elevated so as to be disengaged from the shaft by means of the segmental cog-bar $g$. The arms G are of such a length as to carry the roller $a'$ away from the shaft when it is elevated by the cog-bar $g$ so as to allow the spade-shaft to play freely between the rollers $a$ $a'$, and the spade, on being thus relieved, drops down and enters the earth by its own gravity. The cog-bar $g$ is attached to two rods that slide in grooves in the blocks $n$ attached to the frame, as shown, to keep it in position, and is moved out, to engage with the cog-wheel $e'$, by means of bent lever H, the latter being actuated by means of a pin, $i$, in the side of the spade-shaft, which, when the latter is raised to the proper height, engages with the horizontal arm of lever H and raises it, thereby causing a short arm at the top of the lever to move the cog-bar $g$ forward to gear with cog-wheel $e'$, so that the latter by its rotation is carried up, as shown in Fig. 2, and thus the roller $a$ is disengaged from the spade-shaft D, and the latter being no longer held by the friction-rollers the spade is left free to drop down and by its own gravity to enter the earth, as before described. There is a blank space at the top of the cog-bar $g$, against which the cogs of wheel $e'$ strike when raised up to it and move the cog-bar back to its original position in readiness to repeat the above-described operation. As the spades reach the desired elevation the soil brought up by them is pushed out by stationary plungers E attached to rods fixed in the plates that slide upon the longitudinal timber A', and is received upon a reciprocating tipping-table, by which it is dumped to the side of the ditch.

The machine is designed to have a constant movement forward; and if the spades were rigid in their vertical position the lower ends would be liable to catch against the earth and thus might be broken. To avoid this the spade-shafts run through guide-plates N that are arranged to slide in the longitudinal timbers A', which allow them to turn back, when caught at the bottom, sufficiently to prevent being broken. The rods to which the plungers or scrapers E are fixed are attached to the bottom plates of the slides so that the plungers are kept in proper position to enter the spades as they descend.

The dumping-tables M are mounted on low trucks that run on slightly-inclined ways, and are arranged for operation as follows: Rods I, pivoted on each side at the rear end of the tables, extend forward, and are pivoted at the other and to the lower end of bent levers J, which have their fulcrum at O in the upright timbers of the frame. A rod, r, bent in two right angles, as shown in Fig. 1, is pivoted in the upper ends of lever J. The two upright ports of rod r move in a vertical direction, and are kept in place by guides K. The guides K are slightly inclined from a perpendicular, for the purpose presently described. The dumping-table is operated by means of the upward and downward movement of the spade, to which a small hook or device, S, is attached near the top of the blade, as shown in Fig. 2, which, as the spades are raised as before described, engages with the horizontal portion of rod r and raises it, and operates the lever J to draw the tables M back, as shown in Fig. 2, into position to receive the dirt as it is pushed out of the spades. The inclined guides are so arranged as to force the rod r back under the projection in the hook S as the spade ascends and retains it there, so that, when the spades are released from the friction-rollers a a', as before described, and drop down, the hooks carry the rods r down with them, and thus carry the dumping tables out, as shown in Fig. 3, the tables being tipped by a stop that prevents them from being carried forward beyond a certain point, when the lever J tips up the rear end of the table, as shown. When the spade has descended so as to carry the hook down to the bottom of the guide K the rod r is brought to the opening in the hook and is disengaged from it, leaving the spade to drop free of any incumbrance the remainder of the distance.

It is intended to operate the machine and to propel it forward by either steam or horse-power applied in such a way to the shaft L, Fig. 3, as to rotate it, thus securing the actuation of the spades by the bevel gearing n that puts the shaft F in motion, and by cone-pulleys on the shaft L which, being belted onto other cone-pulleys on the axle B B, secure such forward speed as may be desired.

I claim as my invention—

1. The friction-rolls $a$ and cog-wheels $e$ on shaft F, in combination with the friction-rolls $a'$ and cog-wheels $e'$ hung in arms G arranged to operate the spades C C', substantially as set forth.

2. The arrangement of the rods I attached to the dumping-tables M and to the bent lever J, bent rod $r$, and guides K, constructed as described, in combination with hook S attached to the spade C, substantially as and for the purpose set forth.

3. The cog-bar $g$ and bent lever H in combination with cog-wheel $e'$ and pin $i$ in spade-shaft D, all constructed and arranged substantially as and for the purpose set forth.

FRANKLIN TAYLOR.

Witnesses:
O. F. MAYHEW,
G. A. SKINNER. (114)